United States Patent
Seo et al.

(10) Patent No.: US 8,891,399 B2
(45) Date of Patent: Nov. 18, 2014

(54) METHOD OF REDUCING INTERCELL INTERFERENCE IN WIRELESS COMMUNICATION SYSTEM AND APPARATUS THEREOF

(75) Inventors: Inkwon Seo, Anyang-si (KR); Hanbyul Seo, Anyang-si (KR); Byounghoon Kim, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 53 days.

(21) Appl. No.: 13/824,251

(22) PCT Filed: Oct. 12, 2011

(86) PCT No.: PCT/KR2011/007566
§ 371 (c)(1),
(2), (4) Date: Mar. 15, 2013

(87) PCT Pub. No.: WO2012/057462
PCT Pub. Date: May 3, 2012

(65) Prior Publication Data
US 2013/0176887 A1 Jul. 11, 2013

Related U.S. Application Data

(60) Provisional application No. 61/406,566, filed on Oct. 25, 2010, provisional application No. 61/418,856, filed on Dec. 1, 2010, provisional application No. 61/421,179, filed on Dec. 8, 2010.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04W 24/02 | (2009.01) |
| H04B 7/06 | (2006.01) |
| H04J 11/00 | (2006.01) |
| H04B 7/02 | (2006.01) |

(52) U.S. Cl.
CPC ............ *H04W 24/02* (2013.01); *H04B 7/0639* (2013.01); *H04J 11/0056* (2013.01); *H04B 7/024* (2013.01); *H04B 7/0626* (2013.01)
USPC ........ 370/252; 370/334; 455/63.1; 455/452.2

(58) Field of Classification Search
USPC .............. 370/252, 332, 334; 445/63.1, 114.2, 445/452.2
See application file for complete search history.

(56) References Cited

U.S. PATENT DOCUMENTS 8,442,543 B2 * 5/2013 Shin et al. .................. 455/452.1
2009/0215480 A1 8/2009 Kim et al.
(Continued)

OTHER PUBLICATIONS

"Draft LS on CSI measurements on restricted subframes for eICIC"; R1-106496; 3GPP TSG-RAN WG1 #63, Nov. 15-19, 2010.*
(Continued)

*Primary Examiner* — Benjamin H Elliott, IV
(74) *Attorney, Agent, or Firm* — Lee, Hong, Degerman, Kang & Waimey

(57) ABSTRACT

A method for transmitting a downlink signal through coordinated beamforming with a neighboring cell at a serving cell includes transmitting first subframe information for designating one or more subframes to the neighboring cell, transmitting first Precoding Matrix Index (PMI) restriction related information including one or more PMIs to a User Equipment (UE) of the serving cell, the PMIs forming a beam so that interference affecting the neighboring cell in the one or more subframes has a constant characteristic, receiving first Channel State Information (CSI) reporting measured in the one or more subframes based on the first PMI restriction related information from the UE of the serving cell, and transmitting a downlink signal to the UE of the serving cell based on the first CSI reporting, the neighboring cell receiving CSI reporting corresponding to the neighboring cell, measured by the UE of the neighboring cell in the one or more subframes.

10 Claims, 15 Drawing Sheets

(56) References Cited

U.S. PATENT DOCUMENTS

| | | | |
|---|---|---|---|
| 2010/0002643 A1* | 1/2010 | Han et al. | 370/329 |
| 2010/0048233 A1* | 2/2010 | Kim et al. | 455/501 |
| 2011/0170427 A1* | 7/2011 | Koivisto et al. | 370/252 |
| 2012/0010318 A1* | 1/2012 | Tan et al. | 522/113 |
| 2013/0176887 A1* | 7/2013 | Seo et al. | 370/252 |
| 2014/0010318 A1* | 1/2014 | Kim et al. | 375/267 |

OTHER PUBLICATIONS

"Estimation of extended PMI feedback signalling required for user intra-cell and inter-cell coordination"; R1-093780; 3GPP TSG RAN WG1 #58bis Meeting, Oct. 16. Oct. 2009.*

"Consideration on performance of coordinated beamforming with PMI feedback"; R1-093781; 3GPP TSG RAN WG1 #58bis Meeting, Oct. 16. Oct. 2009.*

Giese, et al., "Performance Upper Bounds for Coordinated Beam Selection in LTE-Advanced," 2010 International ITG Workshop on Smart Antennas (WSA 2010), Feb. 2010, 6 pages.

Jang, et al., "Transmit Beamforming based Inter-cell Interference Alignment and User Selection with CoMP," 2010 IEEE 72nd Vehicular Technology Conference Fall (VTC 2010-Fall) Sep. 2010, 5 pages.

PCT International Application No. PCT/KR2011/007566, Notification of Transmittal of the International Search Report and the Written Opinion of the International Searching Authority, or Declaration dated Apr. 4, 2012, 9 pages.

* cited by examiner

FIG. 2
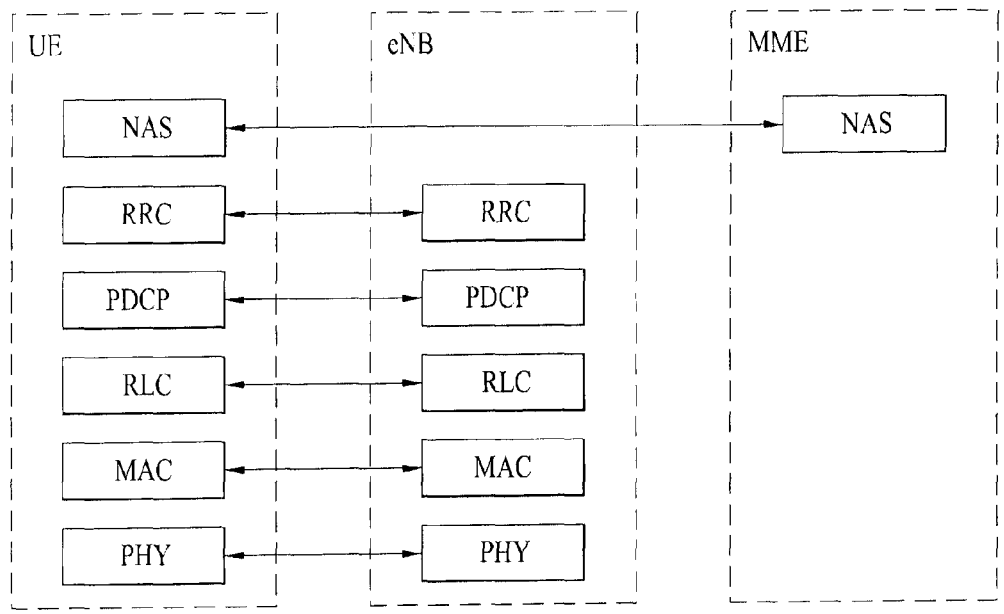
(a) CONTROL-PLANE PROTOCOL STACK
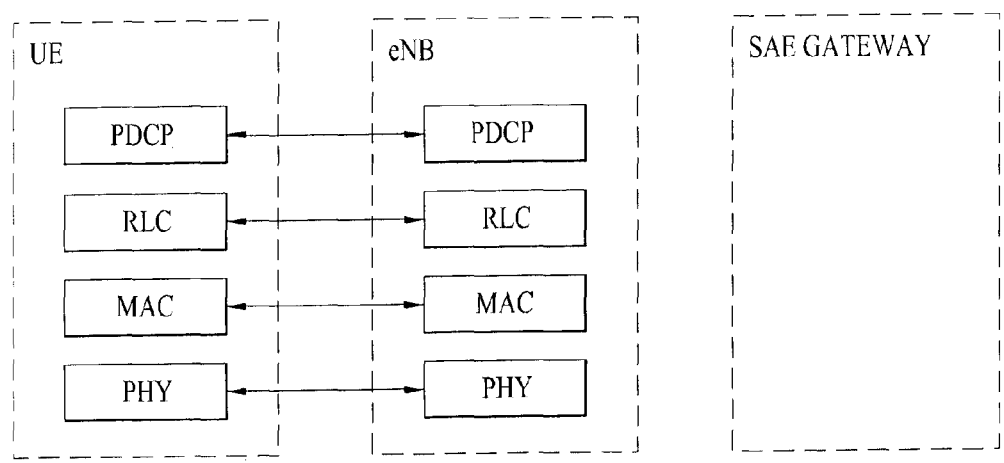
(b) USER-PLANE PROTOCOL STACK

METHOD OF REDUCING INTERCELL INTERFERENCE IN WIRELESS COMMUNICATION SYSTEM AND APPARATUS THEREOF

CROSS-REFERENCE TO RELATED APPLICATIONS

This application is the National Stage filing under 35 U.S.C. 371 of International Application No. PCT/KR2011/007566, filed on Oct. 12, 2011, which claims the benefit of U.S. Provisional Application Ser. No. 61/406,566, filed on Oct. 25, 2010, U.S. Provisional Application Ser. No. 61/418,856, filed on Dec. 1, 2010 and U.S. Provisional Application Ser. No. 61/421,179, filed on Dec. 8, 2010, the contents of which are all hereby incorporated by reference herein in their entirety.

TECHNICAL FIELD

The present invention relates to a wireless communication system, and more particularly, to a method for reducing intercell interference in a wireless communication system, and an apparatus thereof.

BACKGROUND ART

As an example of a mobile communication system to which the present invention is applicable, a 3rd Generation Partnership Project Long Term Evolution (hereinafter, "LTE") communication system is described in brief.

FIG. 1 is a diagram schematically showing a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNode Bs may simultaneously transmit multiple data streams for a broadcast service, a multicast service, and/or a unicast service.

One or more cells may exist in one eNode B. A cell is set to use one of bandwidths of 1.25, 2.5, 5, 10, and 20 MHz to provide a downlink or uplink transport service to several UEs. Different cells may be set to provide different bandwidths. The eNode B controls data transmission and reception for a plurality of UEs. The eNode B transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNode B transmits uplink scheduling information with respect to uplink data to a corresponding UE to inform the UE of an available time/frequency domain, coding, data size, and HARQ-related information. An interface for transmitting user traffic or control traffic may be used between eNode Bs. A Core Network (CN) may include the AG, a network node for user registration of the UE, and the like. The AG manages mobility of a UE on a Tracking Area (TA) basis, wherein one TA includes a plurality of cells.

Although radio communication technology has been developed up to LTE based on Wideband Code Division Multiple Access (WCDMA), demands and expectations of users and providers continue to increase. In addition, since other radio access technologies continue to be developed, new technical evolution is required to secure future competitiveness. For example, decrease of cost per bit, increase of service availability, flexible use of a frequency band, simple structure, open interface, and suitable power consumption by a UE are required.

DISCLOSURE

Technical Problem

An object of the present invention devised to solve the problem lies in providing a method and apparatus for reducing intercell interference in a wireless communication system.

Technical Solution

The object of the present invention can be achieved by providing a method for transmitting a downlink signal through coordinated beamforming with a neighboring cell at a serving cell in a wireless communication system, including transmitting first subframe information for designating one or more subframes to the neighboring cell, transmitting first Precoding Matrix Index (PMI) restriction related information including one or more PMIs to a User Equipment (UE) of the serving cell, wherein the PMIs form a beam so that interference affecting the neighboring cell in the one or more subframes has a constant characteristic, receiving first Channel State Information (CSI) reporting measured in the one or more subframes based on the first PMI restriction related information from the UE of the serving cell, and transmitting a downlink signal to the UE of the serving cell based on the first CSI reporting, wherein the neighboring cell receives CSI reporting corresponding to the neighboring cell, measured by the UE of the neighboring cell in the one or more subframes.

The neighboring cell may transmit a downlink signal to the UE of the neighboring cell based on the CSI reporting corresponding to the neighboring cell in one or more subframes.

The first subframe information may be transmitted to the neighboring cell through an X2 interface. The first PMI restriction related information may be transmitted to the UE of the serving cell through upper layer signaling.

The method may further include transmitting second subframe information indicating one or more subframes to the neighboring cell, transmitting second PMI restriction related information including one or more PMIs having a reduced affect on the neighboring cell to the UE of the serving cell, and receiving second CSI reporting measure in the one or more subframes based on the second PMI restriction related information from the UE of the serving cell. In the one or more subframes included in the first subframe information, the first CSI reporting of the serving cell may be restricted based on the PMIs included in the first PMI restriction related information, and in the one or more subframes included in the second subframe information, the second CSI reporting of the serving cell may be restricted based on the PMIs included in the second PMI restriction related information.

Each of the first subframe information and the second subframe information may include bitmap information for designating the one or more subframes and PMI restriction information corresponding to each of the one or more subframes.

If the same PMI is included in the first PMI restriction information and the second PMI restriction information, the first CSI reporting and the second CSI reporting may be restricted based on the same PMI in a subframe designated commonly by the first subframe information and the second subframe information.

The method may further include receiving feedback information corresponding to the first subframe information from the neighboring cell, wherein the feedback information may include at least one of information as to whether the neighboring cell uses the one or more subframes designated by the first subframe information and information as to the number of subframes which should be increased or decreased.

The first subframe information may be transmitted to the neighboring cell through an X2 interface. The first PMI restriction related information may be transmitted to the UE of the serving cell through upper layer signaling.

The CSI reporting corresponding to the neighboring cell may be measured by the UE of the neighboring cell under the assumption that interference affecting the neighboring cell by the serving cell in the one or more subframes has a constant characteristic.

Advantageous Effects

According to the embodiments of the present invention, a coordinated beamforming scheme can be effectively applied in a wireless communication system to which a CoMP scheme is applied.

The effects which can be obtained from the present invention are not limited to the above-mentioned effects, and other effects not mentioned above can be clearly understood by one skilled in the art from the following description of the embodiments of the present invention.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 is a diagram showing structures of a control plane and a user plane of a radio interface protocol between a UE and an E-UTRAN based on the 3GPP radio access network specification;

MODE FOR INVENTION

Figure 1:
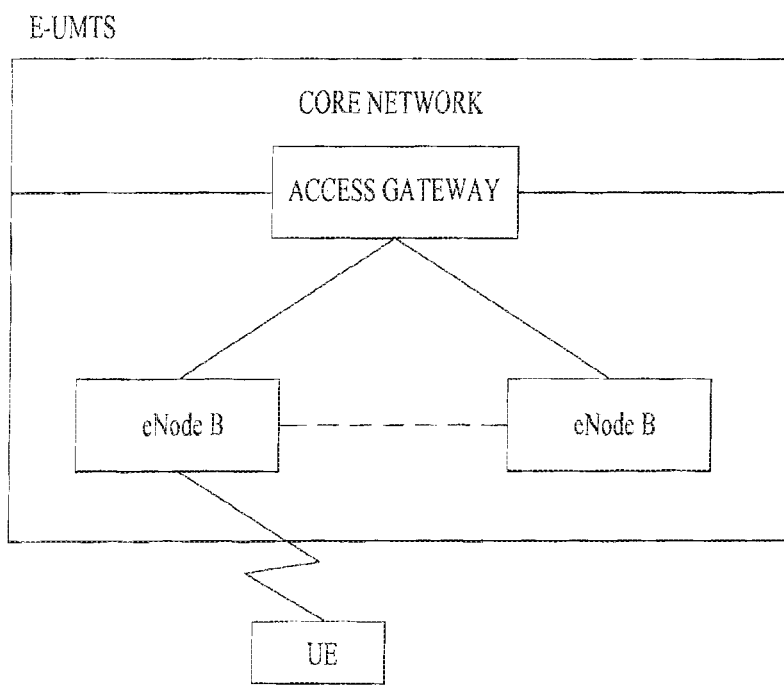
FIG. 1 is a diagram schematically showing a network structure of an E-UMTS as an exemplary radio communication system.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention will be described based on an LTE system and an LTE-A system, the LTE system and the LTE-A system are only exemplary and the embodiments of the Present invention can be applied to all communication systems corresponding to the aforementioned definition. Also, although the embodiments of the present invention will herein be described based on FDD mode, the FDD mode is only exemplary and the embodiments of the present invention can easily be applied to H-FDD or TDD.

FIG. 2 is a diagram showing structures of a control plane and a user plane of a radio interface protocol between a UE and an E-UTRAN based on the 3GPP radio access network specification. The control plane refers to a path used for transmitting control messages, which are used by a User Equipment (UE) and a network to manage a call. The user plane refers to a path used for transmitting data generated in an application layer, e.g., voice data or Internet packet data.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. Radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of the eNB is set to use one of bandwidths such as 1.25, 2.5, 5, 10, 15, and 20 MHz to provide a downlink or uplink transmission service to UEs. Different cells may be set to provide different bandwidths.

Downlink transport channels for data transmission from the network to the UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
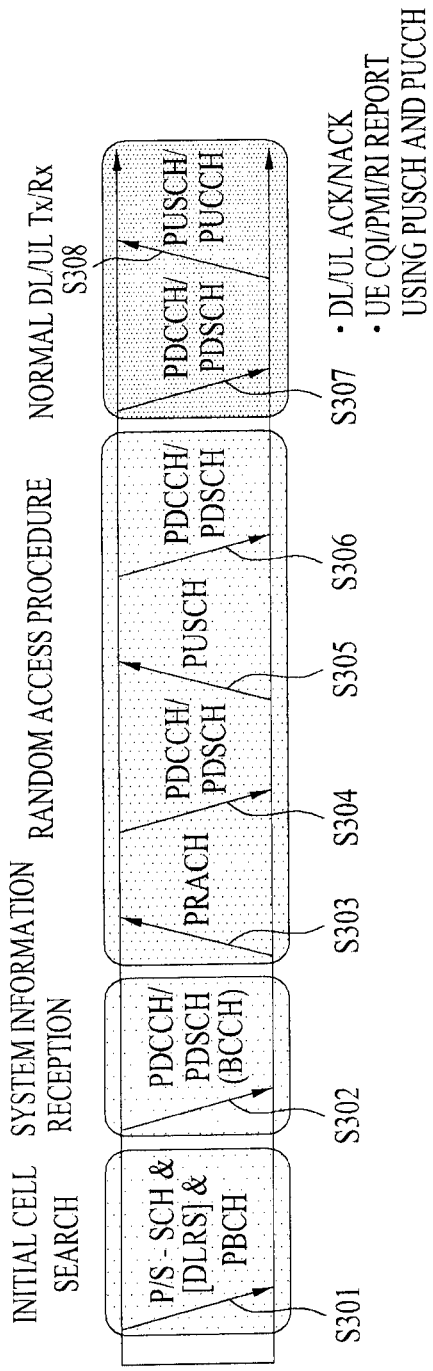
FIG. 3 is a diagram showing physical channels used in a 3GPP system and a general signal transmission method using the same.

FIG. 3 is a diagram showing physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of the initial cell search, the UE may receive a Physical Downlink Control Channel (PDCCH) and a Physical Downlink Shared Channel (PDSCH) according to information included in the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information transmitted by the UE to the eNB through uplink or received by the UE from the eNB through downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
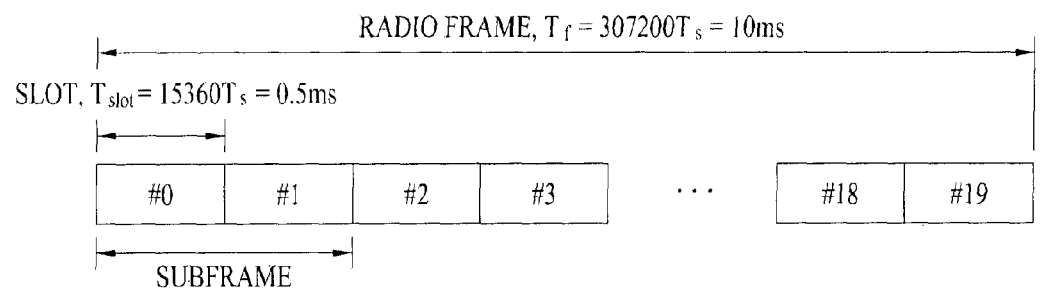
FIG. 4 is a diagram showing the structure of a radio frame used in an LTE system.

FIG. 4 is a diagram showing the structure of a radio frame used in an LTE system.

Referring to FIG. 4, the radio frame has a length of 10 ms (327200 $T_s$) and includes 10 equally-sized subframes. Each of the subframes has a length of 1 ms and includes two slots. Each of the slots has a length of 0.5 ms (15360 $T_s$). In this case, $T_s$ denotes sampling time and is represented by $T_s=1/(15 \text{ kHz} \times 2048)=3.2552\times10^{-8}$ (about 33 ns). Each slot includes a plurality of OFDM symbols or SC-FDMA symbols in a time domain and includes a plurality of resource blocks in a frequency domain. In the LTE system, one resource block includes 12 subcarriers×7 (or 6) OFDM symbols or SC-FDMA symbols. A Transmission Time Interval (TTI) which is a unit time for data transmission may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
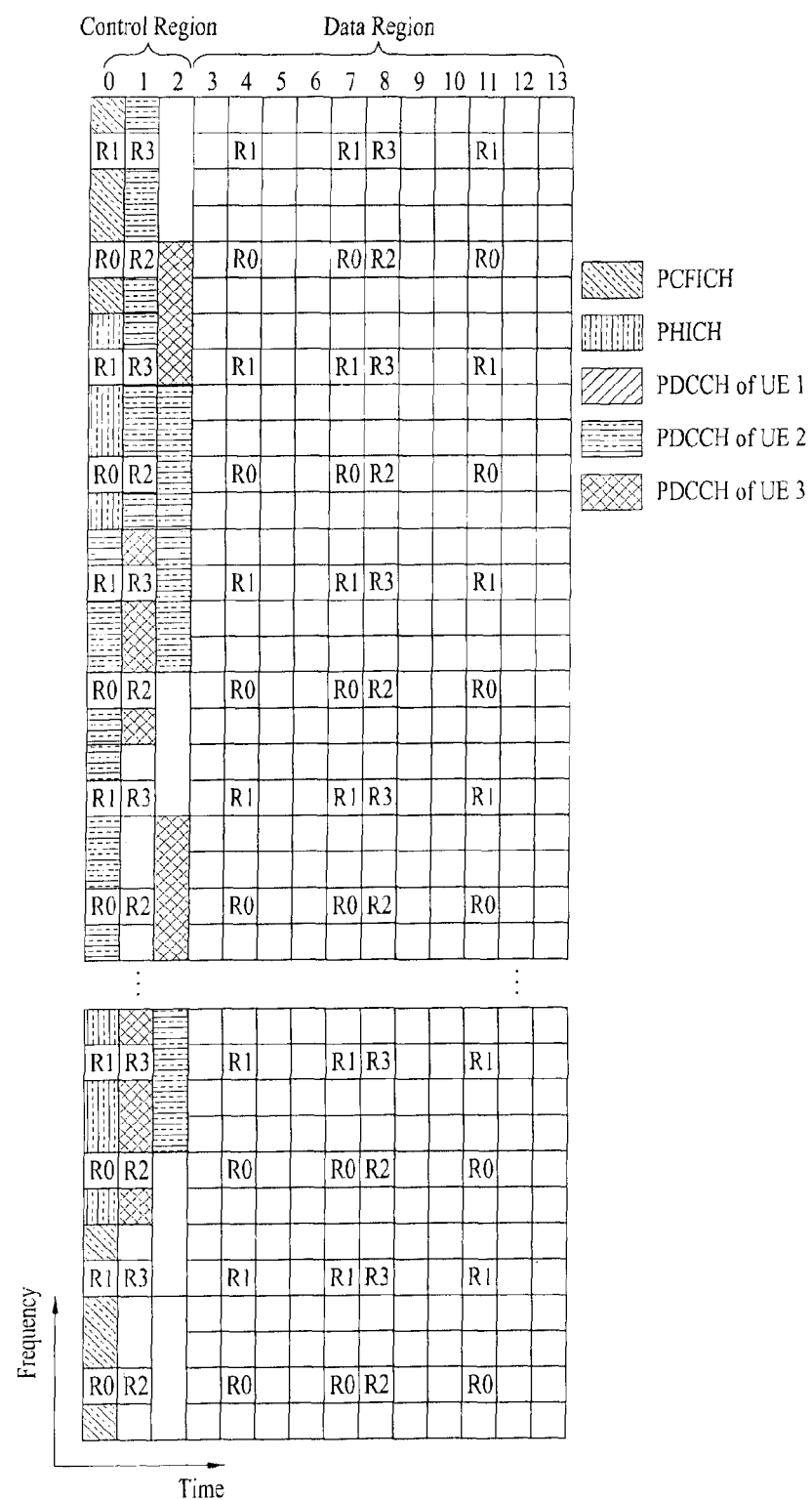
FIG. 5 is a diagram showing the structure of a downlink radio frame used in an LTE system.

FIG. 5 is a diagram showing a control channel contained in a control region of one subframe in a downlink radio frame.

Referring to FIG. 5, one subframe includes 14 OFDM symbols. First to third ones of the 14 OFDM symbols may be used as a control region and the remaining OFDM symbols (i.e., 13 to 11 OFDM symbols) may be used as a data region, according to subframe setting. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources, to which the RS is not allocated, in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier×one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain a diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are perform decoding are contained in the PDCCH. For example, it is assumed that a specific PDCCH is CRC-masked with a Radio Network Temporary Identity (RNTI) 'A', and information about data, that is transmitted using radio resources 'B' (e.g., frequency location) and transport format information 'C' (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Hereinafter, a MIMO system will be described. Multiple-Input Multiple-Output (MIMO) refers to a method of using multiple transmission antennas and multiple reception antennas to improve data transmission/reception efficiency. Namely, a plurality of antennas is used in a transmitting end or a receiving end of a wireless communication system so that capacity can be increased and performance can be improved. Hereinafter, MIMO may indicate multiple antennas in this document.

MIMO technology does not depend on a single antenna path in order to receive a single message. Instead, MIMO technology collects data fragments received via several antennas, merges the data fragments, and forms complete data. The use of MIMO technology can increase system coverage while improving data transmission rate within a cell area of a specific size or guaranteeing a specific data transmission rate. MIMO technology can be widely used in mobile communication terminals and relay nodes. MIMO technology can overcome the limitations of the restricted amount of transmission data of single antenna based mobile communication systems.

Figure 6:
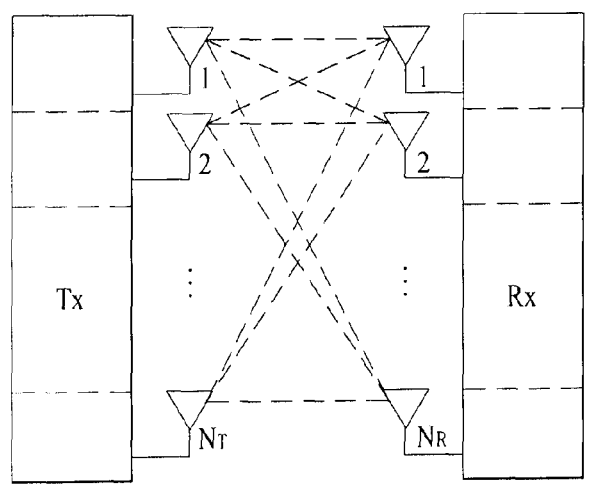
FIG. 6 is a diagram showing the configuration of a general MIMO communication system.

The configuration of a general MIMO communication system is shown in FIG. 6. A transmitting end is equipped with $N_T$ transmission antennas and a receiving end is equipped with $N_R$ reception antennas. If a plurality of antennas is used both in the transmitting end and in the receiving end, theoretical channel transmission capacity increases unlike the case where only either the transmitting end or the receiving end uses a plurality of antennas. Increase in channel transmission capacity is proportional to the number of antennas, thereby improving transmission rate and frequency efficiency. If a maximum transmission rate when using a signal antenna is $R_o$, a transmission rate when using multiple antennas can be theoretically increased by the product of the maximum transmission rate $R_o$ by a rate increment $R_i$. The rate increment $R_i$ is represented by the following equation 1 where $R_i$ is the smaller of $N_T$ and $N_R$.

$$R_i = \min(N_T, N_R) \qquad \text{[Equation 1]}$$

For example, in a MIMO communication system using four transmission antennas and four reception antennas, it is possible to theoretically acquire a transmission rate four times that of a single antenna system. After an increase in the theoretical capacity of the MIMO system was first proved in the mid-1990s, various techniques for substantially improving data transmission rate have been under development. Several of these techniques have already been incorporated into a variety of wireless communication standards including, for example, $3^{rd}$ generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

To describe a communication method in a MIMO system in detail, a mathematical model thereof is given below. As shown in FIG. 6, it is assumed that $N_T$ transmission antennas and $N_R$ reception antennas are present. In the case of a transmission signal, a maximum number of transmittable pieces of information is $N_T$ under the condition that $N_T$ transmission antennas are used, so that transmission information can be represented by a vector represented by the following equation 2:

$$s = [s_1, s_2, \ldots, s_{N_T}]^T \qquad \text{[Equation 2]}$$

Meanwhile, individual transmission information pieces $s_1$, $s_2, \ldots, s_{N_T}$ may have different transmission powers. In this case, if the individual transmission powers are denoted by $P_1$, $P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In Equation 3, using a diagonal matrix P of a transmission power, $\hat{s}$ can be represented by the following Equation 4:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

A weight matrix W may be applied to the information vector $\hat{s}$ having adjusted transmission powers to configure $N_T$ transmission signals $x_1, x_2, \ldots, x_{N_T}$ to be actually transmitted. In this case, the weight matrix is adapted to properly distribute transmission information to individual antennas according to transmission channel situations. The transmission signals $x_1$, $x_2, \ldots, x_{N_T}$ can be represented by the following Equation 5 using a vector X, where $w_{ij}$ is a weight between the i-th transmission antenna and the j-th information, and W is a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$

[Equation 5]

$$W\hat{s} = WPs$$

Generally, the physical meaning of a rank of a channel matrix may be a maximum number of different transmittable information in a given channel. Accordingly, since the rank of the channel matrix is defined as the smaller of the number of rows or columns, which are independent of each other, the rank of the matrix is not greater than the number of rows or columns. A rank rank(H) of a channel matrix H is restricted as follows.

$$\text{rank}(H) \leq \min(N_T, N_R) \quad \text{[Equation 6]}$$

Define each of different information transmitted using MIMO technology as a 'transmission stream' or simply 'stream'. The 'stream' may be referred to as a 'layer'. Then the number of transmission streams is not greater than a rank of a channel which is a maximum number of different transmittable information. Accordingly, the channel matrix h may be indicted by the following Equation 7:

$$\text{\# of streams} \leq \text{rank}(H) \leq \min(N_T, N_R) \quad \text{[Equation 7]}$$

where '# of streams' denotes the number of streams. It should be noted that one stream can be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid type of the spatial diversity and the spatial multiplexing.

Hereinafter, a Reference Signal (RS) will be described in detail. For channel measurement, an RS, of which both a transmitting side and a receiving side are aware, is generally transmitted from the transmitting side to the receiving side together with data. Such an RS functions to perform a demodulation process by informing the transmitting and receiving sides of a modulation scheme as well as channel measurement. The RS is divided into a Dedicated RS (DRS) for an eNB and a specific UE, i.e. a UE-specific RS, and a Common RS (CRS) which is a cell-specific RS for all UEs within a cell. The cell-specific RS includes an RS for reporting CQI/PMI/RI measured by a UE to an eNB and such RS is referred to as a Channel Station Information-RS (CSI-RS).

Figure 7:
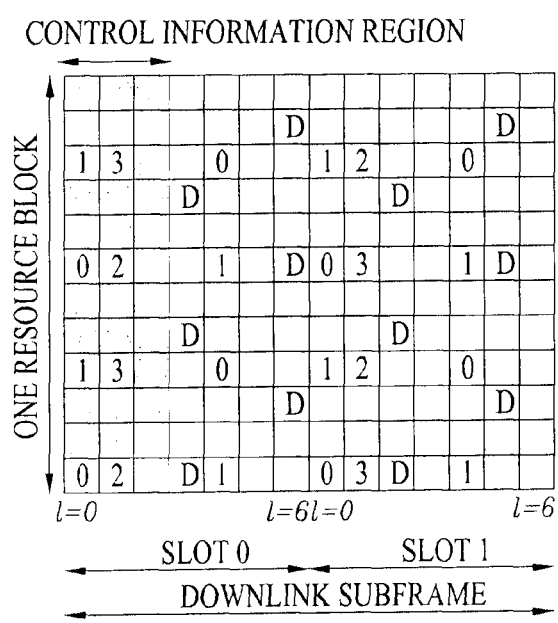
FIGS. 7 and 8 are diagrams showing the structure of a reference signal in an LTE system supporting downlink transmission using 4 antennas.
Figure 8:
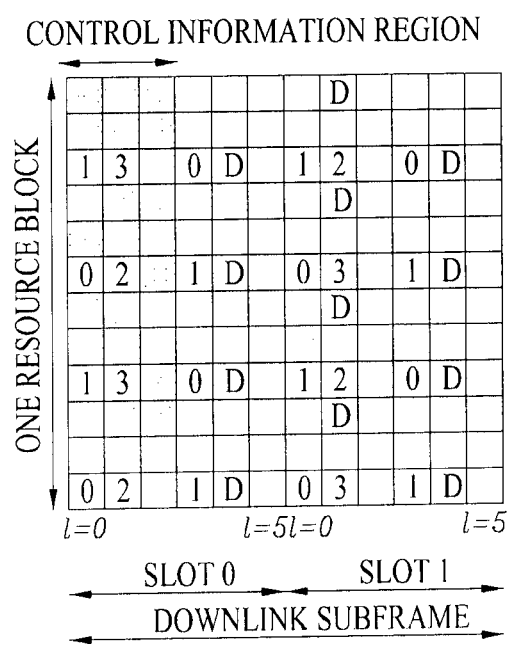

FIGS. 7 and 8 are diagrams showing the structure of an RS in an LTE system supporting downlink transmission using 4 antennas. Especially, FIG. 7 is for a normal Cyclic Prefix (CP) and FIG. 8 is for an extended CP.

Referring to FIGS. 7 and 8, '0' to '3' indicated in the lattice correspond to antenna ports 0 to 3, respectively, and denote CRSs which are cell-specific RSs transmitted for channel measurement and data demodulation. The CRSs, which are cell-specific RSs, may be transmitted to a UE through all control information regions as well as a data information region.

'D's indicated in the lattice denote downlink Demodulation-RSs (DM-RSs) which are UE-specific RSs. The DM-RSs support single-antenna port transmission through a PDSCH. Whether DM-RSs, which are UE-specific RSs, are present is signaled to a UE through an upper layer. FIGS. 7 and 8 show DM-RSs corresponding to an antenna port 5. DM-RSs for antenna ports 7 to 14 are defined in 3GPP standard document 36.211.

Meanwhile, a mapping rule of an RS to a Resource B Block (RB) may be expressed by Equations 8 to 10. The following Equation 8 indicates a CRS mapping rule, Equation 9 indicates a DRS mapping rule to which a normal CP is applied, and Equation 10 indicates a DRS mapping rule to which an extended CP is applied.

$$k = 6m + (v + v_{shift}) \bmod 6 \quad \text{[Equation 8]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

$$k = (k') \bmod N_{sc}^{RB} + N_{sc}^{RB} \cdot n_{PRB} \quad \text{[Equation 9]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 10]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 8 to 10, k and p denote a subcarrier index and an antenna port, respectively. $N_{RB}^{DL}$, $n_s$, and $N_{cell}^{ID}$ denote the number of RBs allocated to downlink, the number of slot indexes, and the number of cell IDs, respectively. The location of the RS in a frequency domain depends on a value $V_{shift}$.

Meanwhile, in an LTE-A system which is a standard of a future-generation mobile communication system, support for a Cooperative Multi-Point (CoMP) transmission scheme, which has not been supported in conventional standards, is expected in order to improve data transmission rate. The CoMP transmission scheme refers to a transmission scheme in which two or more eNBs or cells coordinately communicate with a UE to improve communication performance between a UE located in a shadow area and an eNB (or cell or sector).

The CoMP transmission scheme may be divided into a Joint Processing (JP) scheme of a cooperative MIMO form through data sharing and a Coordinated Scheduling/Beamforming (CS/CB) scheme.

In the JP scheme in downlink, a UE may instantaneously and simultaneously receive data from eNBs performing a CoMP transmission scheme and may combine signals received from the respective eNBs, thereby improving reception performance. In the CoMP-CS/CB scheme, however, the UE may instantaneously receive data from one eNB through beamforming.

In the JP scheme in uplink, respective eNBs may simultaneously receive a PUSCH signal from a UE. In the CoMP-CS/CB scheme, however, only one eNB receives the PUSCH signal. Whether to use the CoMP-CS/CB scheme is determined by coordinated cells (or eNBs).

In the present invention, a method for reducing intercell interference in a coordinated beamforming scheme among CoMP transmission schemes is discussed.

First Embodiment

A coordinated beamforming scheme proposed in the present invention is as follows.

Among cells for coordinated beamforming, an eNB of one cell, (hereinafter, eNB1), signals a subframe set in which channel measurement can be performed by assuming that there is intercell interference of the same characteristic to eNBs of the other cells, i.e. coordinated cells through an X2 interface. Moreover, the eNB1 may perform beamforming for a cell thereof in a direction of reducing intercell interference in the coordinated cells, i.e. interference affecting the coordinated cells in the signaled subframe set.

In this case, the eNB1 may restrict the beamforming direction by signaling one or more PMIs (hereinafter, PMI restriction information) through an upper layer to UEs belonging to coverage thereof. If a final PMI is achieved by a combination of a long-term PMI and a short-term PMI, a method of restricting the long-term PMI may be used. The PMI restriction information may be effective only in a specific subframe set signaled to the coordinated cells.

For example, in the specific subframe set signaled to the coordinated cells, UEs within coverage of the eNB1 may select a best PMI among PMIs which are restricted to relieve intercell interference to the coordinated cells and may use the selected best PMI for reporting of CSI such as CQI/PMI/RI, and in the other subframes, the UEs within coverage of the eNB1 may perform a general coordinated beamforming scheme, that is, CSI reporting without PMI restriction.

Meanwhile, the eNBs of the coordinated cells receiving signaling of a subframe set in which channel measurement can be additionally performed from the eNB1 trigger resource specific channel measurement so that UEs within corresponding cells may perform channel measurement for CSI reporting in subframes included in the subframe set. Here, resource specific channel measurement may refer to performing CSI reporting by carrying out channel measurement in a subframe in which channel measurement can be performed.

A subframe set in which channel measurement can be performed may be signaled to two or more coordinated cells and may be applied in a frequency domain such as a subband as well as in a subframe domain. Hereinafter, the above-described embodiment will be described in detail through the following 1) to 3).

1) An eNB1 signals a subframe set for performing channel measurement by assuming intercell interference of the same characteristic to an eNB2 through an X2 interface. Information about the subframe set may be signaled in a bitmap form and may use a bitmap for an Almost Blank Subframe (ABS) of enhanced Intercell interference Coordination (eICIC), which is X2 interface signaling. In a subframe designated as an ABS, an interfering cell is configured to transmit only a CRS which is a cell-specific RS and, in some cases, a PBCH, an SCH, paging, etc. having a uniform period as well as the CRS may be transmitted. Signaling period of bitmap information may be limited to a frame unit or a specific time period (e.g. 40 ms considering HARQ process, BCH, SCH transmission period).

2) Meanwhile, a bit of each of the bitmap information for indicating the subframe set may indicate that PMIs of an eNB1 are restricted or PMIs of an eNB1 are not restricted. Alternatively, the bit may indicate a subframe in which an eNB2 is to perform channel measurement and a subframe in which an eNB2 is not to perform channel measurement. Especially, if the bit indicates a subframe in which an eNB2 is to perform channel measurement, it may be assumed that the eNB2 is configured in a direction in which a beam formed in the eNB1 has less of an effect on a cell of the eNB2 in the indicated subframe. If additional CSI for each subframe set is reported in an eNB2 of a coordinated cell, each bit may be used for distinguishing between subframe sets.

In a subframe in which PMIs of an eNB1 are restricted, the eNB1 may restrict the PMIs by scheduling only PMIs which have less of an effect on an eNB2 with respect to UEs within a cell of the eNB1. Alternatively, the direction of a beam may be restricted to have less of an effect on the eNB2 by limiting beam direction determination elements corresponding to PMIs.

3) The eNB2 may select a subframe in which channel measurement is to be performed within a cell of the eNB2 through the subframe set signaled through the X2 interface and signal resource specific channel measurement to UEs within the cell so that the UEs perform CSI reporting only in a specific subframe. In addition, if PMIs are not restricted in the eNB1, the eNB2 may restrict the direction of a beam by performing PMI restriction within the cell of the eNB2.

In the above description, the eNB1 signals a subframe set to the eNB2. However, a method for restricting subframes scheduled by each eNB through coordination between cells within a CoMP set may be considered. For example, the eNB1 may be in charge of scheduling for even-numbered subframes and the eNB2 may be in charge of scheduling for odd-numbered subframes, thereby equally distributing priority between cells. The present invention may be applied not only to a time domain of a subframe unit but also to a combination of a time domain and a frequency domain. In other words, the present invention may be applied using a method in which the eNB1 is in charge of scheduling for specific RBs and the eNB2 is in charge of scheduling for other RBs.

Figure 9:
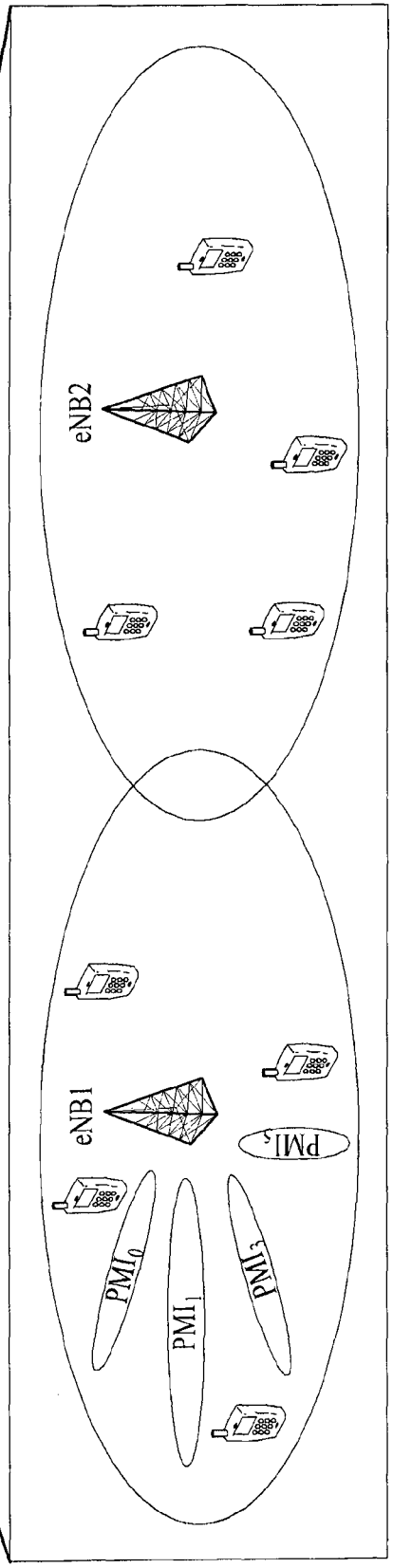
FIG. 9 is a diagram showing a coordinated beamforming scheme according to a first embodiment of the present invention.

FIG. 9 is a diagram showing a coordinated beamforming scheme according to a first embodiment of the present invention. Especially, in FIG. 9, in a subframe set signaled by an eNB1 to an eNB2, "0" indicates that PMIs are not restricted in a cell of the eNB1 and "1" indicates that the direction of a beam is restricted through PMI restriction.

Referring to FIG. 9, the operation of the eNB1 and eNB2 in a subframe signaled as "1" in a subframe set, i.e. a subframe configuration bitmap is as follows.

PMIs for performing CSI reporting by UEs of the eNB1 in a corresponding subframe are restricted to indexes 0, 1, 3, and 5. Accordingly, the UEs of the eNB1 should report CSI such as CQI/PMI/RI to the eNB1 by selecting a best PMI from among measured channel circumstances and the restricted PMIs. In this case, UEs of the eNB2 receive signaling of the corresponding subframe from the eNB2 as a subframe for performing resource specific channel measurement and perform a CSI reporting procedure based on the signaled subframe. In a subframe indicated by "0" on a bitmap, the UEs of the eNB1 may measure and report CSI without any PMI restriction.

In addition, in a subframe indicated by "0" on a bitmap, the eNB2 may measure and report CSI using the same method as the operation of the eNB1.

Second Embodiment

To clarify the present invention, the eNB1 is defined as a signaling cell and the eNB2 is defined as a signaled cell. A PMIset refers to a set of PMIs which have a similar beam direction or are grouped by other criteria. In some cases, there may be PMIs belonging simultaneously to multiple PMIsets.

Subframes which are restricted to report only a specific PMI or PMIset to UEs within a cell for PMI restriction by a signaling cell are defined as a PMI restriction subframe set and may be signaled to UEs in a bitmap form through RRC signaling. A subframe set is information exchanged between eNBs through an X2 interface and refers to a set of subframes in which channel measurement can be performed by assuming that there is intercell interference of the same characteristic.

Figure 10:
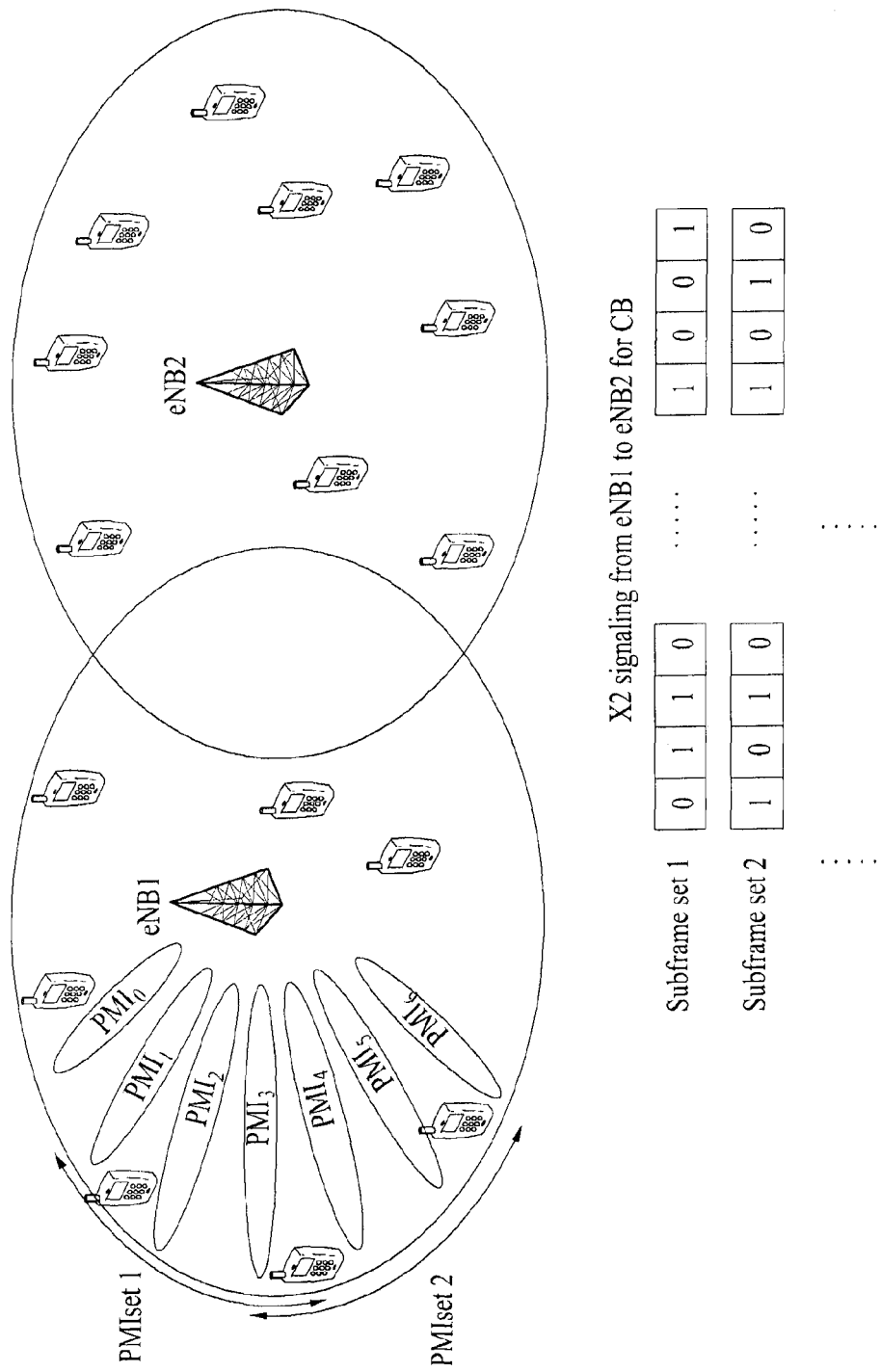
FIG. 10 is a diagram showing a coordinated beamforming scheme according to a second embodiment of the present invention.

FIG. 10 is a diagram showing a coordinated beamforming scheme according to a second embodiment of the present invention. In FIG. 10, it is assumed that a signaling cell is an eNB1, a signaled cell is an eNB2, and the eNB1 signals subframes restricting PMIs by a PMIset 1 to the eNB2 as a PMI restriction subframe set 1 and signals subframes restricting PMIs by a PMIset 2 to the eNB2 as a PMI restriction subframe set 2.

Referring to FIG. 10, the eNB1, a signaling cell, groups a beam direction within the cell into multiple PMIsets and signals PMI restriction subframe sets for each PMIset to the eNB2, a signaled cell, through an X2 interface. It may be assumed in FIG. 10 that intercell interference caused by the eNB1 has similar characteristics in subframes denoted by "1". The eNB1 may perform signaling to UEs within a cell of the eNB2 so that the UEs perform resource specific channel measurement for each PMI restriction subframe set. Hereinafter, the operation of each constituent element in a CoMP set will be described in the following (A) to (C) with reference to FIG. 10.

(A) First, the operation of the eNB1 and UEs within the cell of the eNB1 is described. The eNB1 signals subframes in which the eNB2 can assume that intercell interference caused by the eNB1 has similar characteristics to the eNB2 through an X2 interface. A method in which the eNB1 signals PMI restriction to UEs within the cell is as follows:

i) A bitmap for each PMIset may be individually signaled. In other words, the eNB1 signals PMI restriction subframe sets to UEs in a bitmap form indicating enabling/disabling of a corresponding PMIset and the UEs may select a best PMI per subframe by referring to all signaled PMI restriction subframe sets corresponding to the number of PMIsets. If the eNB1 signals PMI restriction subframe sets to the UEs within the cell thereof, the UEs may interpret the PMI restriction subframe sets as follows.

When overlapped PMIs are present in all PMIsets (e.g. in FIG. 10, a PMI3 is commonly included both in PMIset1 and PMIset2), if a bit indicating a specific frame of all PMI restriction subframe sets is 1, this may indicate that PMI restriction is restricted to the overlapped PMI. If a bit indicating a specific frame of all PMI restriction subframe sets is 0, this may indicate that PMI restriction is not applied.

When no overlapped PMIs are present in PMIsets, if a bit indicating a specific frame of all PMI restriction subframe sets is 1, this may indicate that a corresponding subframe is not scheduled or a specific subframe such as an ABS is configured. Similarly, if a bit indicating a specific frame of all PMI restriction subframe sets is 0, this may indicate that PMI restriction is not applied.

When it is necessary to relieve PMI restriction, if a bit indicating a specific subframe of all PMI restriction subframe sets is 1 and the other bits are 0, this may be interpreted that all PMIs belonging to PMIsets corresponding to "1" are PMIs which can be selected as best PMIs.

ii) However, the above-described method may increase signaling overhead. For example, if PMI restriction subframe sets are signaled in units of 40 bits (40 ms), then bits corresponding to (40 bits*the number of PMIsets) are necessary. For example, if an eNB1 groups PMIs into 3 PMIsets, a total of 120 bits is needed.

Accordingly, a method for indicating information about one subframe using multiple bits may be considered. A UE is aware of PMIsets which can be used in a corresponding subframe by interpreting a state of each subframe and may report CSI based on a specific PMI among corresponding PMIsets through a best PMI selection process.

If such a method is applied, the number of states for indicating each subframe may be determined as (1+the number of PMIsets) where "1" indicates the case where a PMI restriction scheme is not used. For example, if an eNB1 groups PMIs into 3 PMIsets, a state of each subframe may be denoted by two bits: '00' representing that a PMI restriction scheme is not used, '01' indicating PMIset0, '10' indicating PMIset1, and '11' indicating PMIset2. This method has an advantage of performing signaling using only 80 bits.

(B) Next, the operation of the eNB2 and UEs within the cell of the eNB2 is described. The eNB2 assumes that subframes within each subframe set signaled through the X2 interface have similar intercell interference characteristics. Therefore, the eNB2 may cause the UEs within the cell thereof to perform channel measurement in subframes belonging to the same subframe. If there are multiple subframe sets signaled from the eNB1, the eNB2 may cause the UEs within the cell thereof to report a measurement result for each subframe set.

(C) A backhaul feedback operation of the eNB2 is described. If the amount of resources signaled to the eNB2 by the eNB1 is greater than the amount of resources actually necessary in the eNB2, resources are unnecessarily wasted. In an opposite case, that is, if fewer resources than the amount of resources necessary in the eNB2 (or inappropriate resources) are signaled to the eNB2, a problem may occur due to a lack of resources in the cell of the eNB2.

Accordingly, it is proposed to feed back, to the eNB1, information about subframes actually used within the cell of the eNB2 or information about resource request, with respect to each subframe set signaled from the eNB1. In this case, the feedback information may include the following information.

i) A ratio of the number of subframes actually used in the cell of the eNB2 to the number of signaled subframes (in this case, the signaled subframes indicate subframes using only a corresponding PMIset in the cell of the eNB1 or subframes in which the cell of the eNB2 can assume similar intercell interference).

ii) Information as to whether subframes are actually used among the signaled subframe sets (in this case, a bitmap form may be used).

iii) The number of subframes which should be increased or decreased for smooth operation in the cell of the eNB2 (i.e. directly requested by the eNB2 to the eNB1).

For example, if a CSI reporting result applied in a subframe set 1, reported by the UEs within the cell of the eNB2, is better than that applied in a subframe set 2, the eNB2 may request the eNB1 to increase the rate of the subframe set 1 and to decrease the rate of the subframe set 2. To determine priority between the subframe sets (or to decide reduction of rate), a specific reference value may be used, and if a difference in CQI between subframe sets is above a given level, the eNB2 may request that the rate of a subframe set having a relatively worse state be decreased.

iv) If it is determined that coordinated beamforming is not smooth, the eNB2 may request that the eNB1 transmit a new subframe set. For example, if measurement results for both the subframe set 1 and the subframe set 2 are not good, the eNB2 may request the eNB2 to transmit a new subframe set (here, a new subframe set means a subframe set which uses a different PMI from a PMI used in the existing subframe set or assumes intercell interference of a different characteristic from intercell interference assumed in the existing subframe set). The eNB1 may signal the new subframe set through an X2 interface. The new subframe set may be a subframe set which does not belong commonly to the subframe set 1 and subframe set 2.

Meanwhile, decision of a measurement result may determine whether a new subframe set is needed through a threshold value at which coordinated beamforming can be appropriately performed. Alternatively, whether a new PMIset is needed may be determined through comparison with a measurement value of a reference subframe set (subframe set in which PMIs are not restricted in the cell of the eNB1).

v) Finally, the eNB2 may request the eNB1 to transmit the number of subframes necessary in a time domain.

Through such a backhaul feedback operation, waste of resources can be reduced and coordination between cells can be optimized.

In the above embodiment, a method has been proposed in which the eNB1 performs coordinated beamforming by restricting PMIs to be reported to UEs within the cell of the eNB1. However, another method for PMI restriction in terms of a cell may be considered in which the eNB1 receives reporting for PMIs through a general channel measurement process from UEs within the cell without additional bitmap signaling for PMI restriction to the UEs and schedules UEs reporting appropriate PMIs from among the reported PMIs. Thus, the other operations except for the operation of the eNB1, i.e. the operation of the eNB2, backhaul feedback of the eNB2, and the like may be applied in the same manner as the above-proposed method.

Third Embodiment

The third embodiment of the present invention proposes another method for achieving a coordinated beamforming scheme. In the above first and second embodiments, the eNB2 operates based on the assumption that subframes within the same subframe set have similar intercell interference characteristics irrespective of which PMIset is applied to a subframe set signaled from the eNB1. However, in the third embodiment, the eNB2 is aware of information about a PMIset transmitted by the eNB1 and can feed back the information. First, a conventional coordinated beamforming scheme is described.

Figure 11:
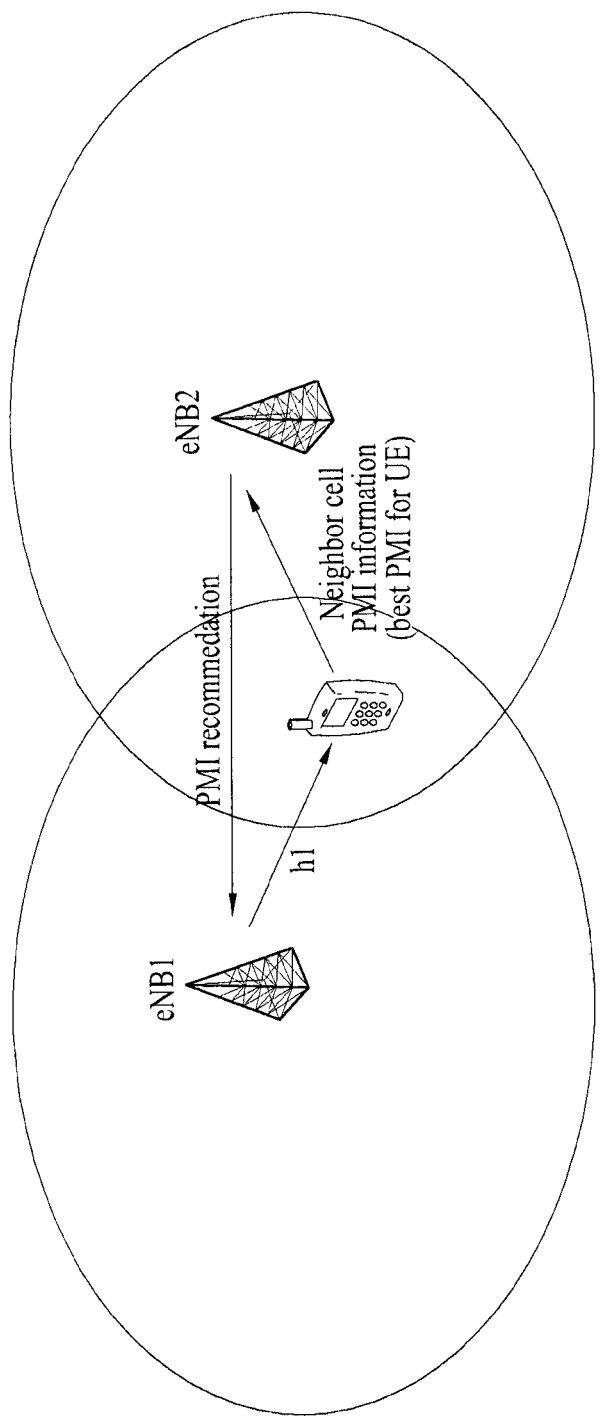
FIG. 11 is a diagram explaining coordinated beamforming among conventional CoMP schemes.

FIG. 11 is a diagram explaining coordinated beamforming among conventional CoMP schemes. In FIG. 11, it is assumed that a serving eNB of a UE is an eNB2.

Referring to FIG. 11, a UE may calculate interference by performing channel measurement from an eNB1 using a reference signal etc., select a PMI having less of an effect on communication with the eNB2, and feed back the selected PMI to the eNB2. Upon receiving the feedback information, the eNB2 requests the eNB1 to use the corresponding PMI and selects an MCS, PMI, etc. for transmission to the UE based on the assumption that the eNB1 uses the corresponding PMI irrespective of whether there is a response from the eNB1.

When such a conventional method is used, if the number of UEs requesting coordinated beamforming is increased, feedback overhead and X2 signaling overhead may be increased. If PMIs are not restricted due to an increase of load of the eNB1, it is difficult to guarantee smooth communication between the UE and the eNB2. If the position of the UE is changed, since a best PMI, i.e. a beam direction of the eNB1 for raising a reception SINR of the UE can also be changed, signaling overhead between the UE and the eNB2, and eNB1 and eNB2 is increased.

In the third embodiment of the present invention, it is proposed to reduce feedback overhead caused by UE mobility by performing coordinated beamforming in terms of multiple UEs (or cells) rather than a single UE. In addition, an efficient coordinated beamforming scheme considering cell load is proposed by combining coordination between spatial cells with coordination between temporal cells.

To apply the third embodiment of the present invention, a PMIset may be configured by a single PMI or a plurality of PMIs having similar intercell interference characteristics. If a plurality of PMIs is grouped, although performance may be lowered in terms of an individual UE, scheduling can be performed in units of given sections within a cell. Accordingly, signaling overhead and feedback overhead is reduced and the number of usable PMIs is increased, thereby implementing efficient coordinated beamforming.

The operation and signaling of a UE and an eNB proposed in the third embodiment of the present invention are as follows.

(A) First, the operation of the UE is described. The UE may estimate a channel from a neighboring cell to the UE through a reference signal etc. of the neighboring cell and estimate interference for the case where an eNB of the neighboring cell uses each PMI through a combination of the estimated channel and a predefined PMI. In the present invention, since coordinated beamforming is performed in units of PMIsets, interference for each PMIset may be determined using methods such as the following i) to iii).

i) The greatest value among interference estimation values for respective PMIs of a PMIset may be set as a representative value of the corresponding PMIset. In other words, the UE estimates interference for respective PMIs within a PMIset and may set an interference amount of a PMI creating the most interference as a representative interference estimation value. Then, since pessimistic estimation is performed in next CSI reporting etc., reliable performance can be maintained.

ii) An average of interference estimation values for respective PMIs of a PMIset is calculated and may be set as a representative value of the corresponding PMIset.

iii) The lowest value among interference estimation values for respective PMIs of a PMIset may be set as a representative value of the corresponding PMIset.

The UE may calculate an SINR for a serving cell at a current location and CSI suitable for the SINR based on the interference estimation value for each PMIset. The calculated CSI may be fed back to an eNB of a serving cell using the following method a) or b). Furthermore, elements of a) and b) may all be fed back.

a) A PMIset of a neighboring cell (i.e. interfering cell) which can maximally maintain an SINR of the UE at a current location and CSI which is calculated under the assumption that the corresponding PMIset is transmitted from the neighboring cell, i.e. calculated in an effective channel circumstance considering a signal of the neighboring cell may be fed back (best companion PMIset).

b) A PMIset (or specific PMI index) of a neighboring cell which can minimally maintain an SINR of the UE at a current location and CSI which is calculated under the assumption that the corresponding PMIset (or specific PMI index) is transmitted from the neighboring cell, i.e. calculated under effective channel circumstances considering a signal of the neighboring cell may be fed back (worst companion PMIset).

Next, the UE may perform channel measurement with respect to subframes having similar intercell interference characteristics according to resource specific channel measurement signaling from an eNB of a serving cell.

(B) In the third embodiment of the present invention, the operation of an eNB may be divided according to which role the corresponding eNB performs. Namely, the operation of the eNB may be defined as the following i) to iii) according to the cases where an eNB (e.g. eNB1 of FIG. 11) of a neighboring cell which is an interfering cell signals information for coordinated beamforming to an eNB (e.g. eNB2 of FIG. 11) of an interfered cell, the eNB of the interfered cell signals information for coordinated beamforming, and information exchange between both cells is needed.

i) If an eNB of a neighboring cell which is an interfering cell adjusts coordinated beamforming, the eNB of the neighboring cell which is the interfering cell performs resource scheduling in a time domain in consideration of cell load and signals a resource scheduling result to an eNB of an interfered cell through an X2 interface. In this case, scheduling is performed in units of subframes and may be carried out by a method for allocating a PMIset used in a corresponding subframe. The eNB of the interfered cell may perform resource scheduling within the interfered cell based on scheduling information within the interfering cell received from the eNB of the interfering cell and a best companion PMI (or worst companion PMI), CSI, etc. reported from UEs within the interfered cell.

ii) If an eNB of a serving cell which is an interfered cell adjusts coordinated beamforming, the eNB of the interfered cell performs resource scheduling in a time domain in consideration of a best companion PMI (or worst companion PMI), CSI, etc. reported from UEs within the cell and signals a resource scheduling result (i.e. PMIset request for each subframe) to an eNB of an interfering cell through an X2 interface. The eNB of the interfering cell performs resource scheduling in a time domain within the interfering cell according to the scheduling result of the interfered cell signaled through the X2 interface and feedback information of UEs within the cell.

iii) If both an eNB of a serving cell and an eNB of a neighboring cell adjust coordinated beamforming, an interfering cell signals an available subframe set which can smoothly support coordinated beamforming of an interference cell to the eNB of an interfered cell through an X2 interface in consideration of cell load. The available subframe set may mean a set of subframes which are acceptable regardless of the PMIset requested by the interfered cell. The eNB of the interfered cell may perform scheduling in consideration of feedback of UEs within the interfered cell with respect to the available subframe set signaled through the X2 interface. Next, the eNB of the interfered cell feeds back a PMIset request in the available subframe set to the eNB of the interfering cell to perform coordinated beamforming.

(C) Next, signaling proposed in the third embodiment of the present invention is described. Signaling according to the third embodiment of the present invention includes signaling between eNBs, (intercell signaling), using an X2 interface and information (intra-cell signaling) signaled through an upper layer by an eNB of each cell to UEs within the cell.

Intercell signaling indicates an eNB of an interfering cell or an eNB of an interfered cell exchange subframes in which coordinated beamforming is to be performed with respect to an eNB of the other cell and information about a PMIset which is to be applied (or which requests application) in the corresponding subframes through an X2 interface.

Intra-cell signaling includes a process in which an eNB informs UEs of subframes in which each UE should perform measurement based on information about coordinated beamforming received through intercell signaling. Through this process, the eNB may receive CSI reporting from UEs under the assumption of similar intercell interference.

Meanwhile, the above-described intercell signaling may be divided into PMIset-based signaling and PMIset state-based signaling.

PMIset-based signaling may signal a PMI restriction subframe set for each PMIset. The PMIset-based signaling can expand or reduce a PMIset implicitly or explicitly.

For example, if a specific subframe is commonly enabled in a PMI restriction subframe set indicating PMIset0 and a PMI restriction subframe set indicating PMIset1, this may be interpreted that both PMIset0 and PMIset1 are applicable in the corresponding subframe according to previously defined or additional signaling or that only a PMI included in both PMIset0 and PMIset1 is applicable. When only a PMI included in the both PMIset0 and PMIset1 is applicable, if there is no PMI included commonly in the two PMIsets, this can be interpreted that reduced transmission power and/or activity is applied in the corresponding subframe.

Next, in the case of PMIset state-based signaling, M (=the number of PMI sets+1) states are defined according to the number of PMIsets and a PMIset applied in each subframe may be signaled using $\lceil \log_2 M \rceil$ bits. In M (=the number of PMI sets+1), "1" indicates that coordinated beamforming is not performed.

For example, if 5 PMIsets are present, a PMIset applied in each subframe may be expressed as 3 bits as shown in Table 1.

TABLE 1

| State | Description |
|---|---|
| 000 | No CB operation (or no PMI restriction) |
| 001 | PMIset0 |
| 010 | PMIset1 |
| 011 | PMIset2 |
| 100 | PMIset3 |
| 101 | PMIset4 |
| 110 | Reserved |
| 111 | Reserved |

Hereinafter, the third embodiment of the present invention is described by way of example. It is assumed in the examples that an interfering cell is an eNB1 and an interfered cell is an eNB2. The present invention may be applied to the case where 3 or more cells perform coordinated beamforming.

Figure 12:
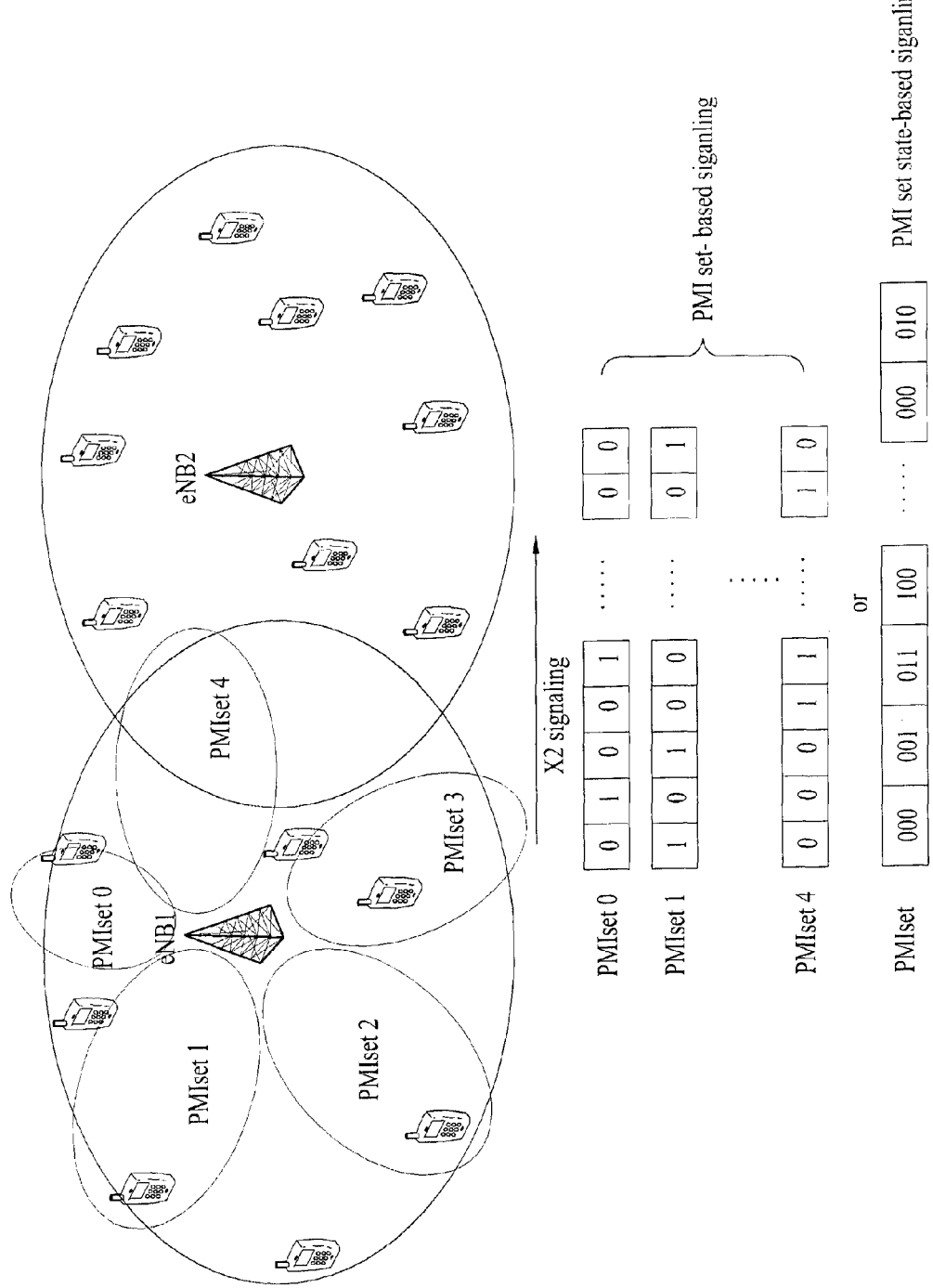
FIG. 12 is a diagram showing an example to which the third embodiment of the present invention is applied.

FIG. 12 is a diagram showing an example to which the third embodiment of the present invention is applied. In FIG. 12, a coordinated beamforming scheme of the third embodiment of the present invention is adjusted by an eNB1 which is an interfering cell.

Referring to FIG. 12, an eNB1 performs scheduling for each subframe based on CSI reporting of UEs within the cell and signals a PMIset to be applied in each subframe to an eNB2 through an X2 interface. If PMIset-based signaling is applied, '1' means that a corresponding PMIset is applied in the cell of the eNB1. If load within the cell is significant, it is possible to set all PMIsets in a specific subframe and the corresponding subframe may be excluded during application of coordinated beamforming.

As described above, when PMIset-based signaling is applied, if a specific subframe in multiple PMIsets is commonly enabled, this may be interpreted that corresponding PMIsets are all applied, and if a PMI included commonly in the corresponding PMIsets is present, this may be interpreted that only the corresponding PMI is applied. Such interpretation may be defined through additional signaling or may be previously defined between constituent elements of a CoMP set.

The eNB2 may schedule UEs in each subframe based on PMIset information for each subframe received from the eNB1 and CSI reported from UEs within a cell of the eNB2. For example, in a subframe to which PMIset1 is applied, UEs having a high reception SINR during application of PMIset1 may be scheduled first.

In FIG. 12, a UE suitable for a PMIset signaled from the eNB1 in a specific frame may not be present in the cell of the eNB2. Especially, in a macrocell and picocell deployment, if the picocell is subject to significant interference from the macrocell which is an interfering cell, a UE of the picocell which can be transmitted and received in a specific PMIset of the macrocell may not be present. In this case, a method for additional feedback of the eNB2 may be considered. As information for additional feedback, the eNB2 may inform the eNB1 of a preferred PMIset or the eNB2 may signal a subframe set indicating that a coordinated beamforming scheme is abandoned to the eNB1.

Figure 13:
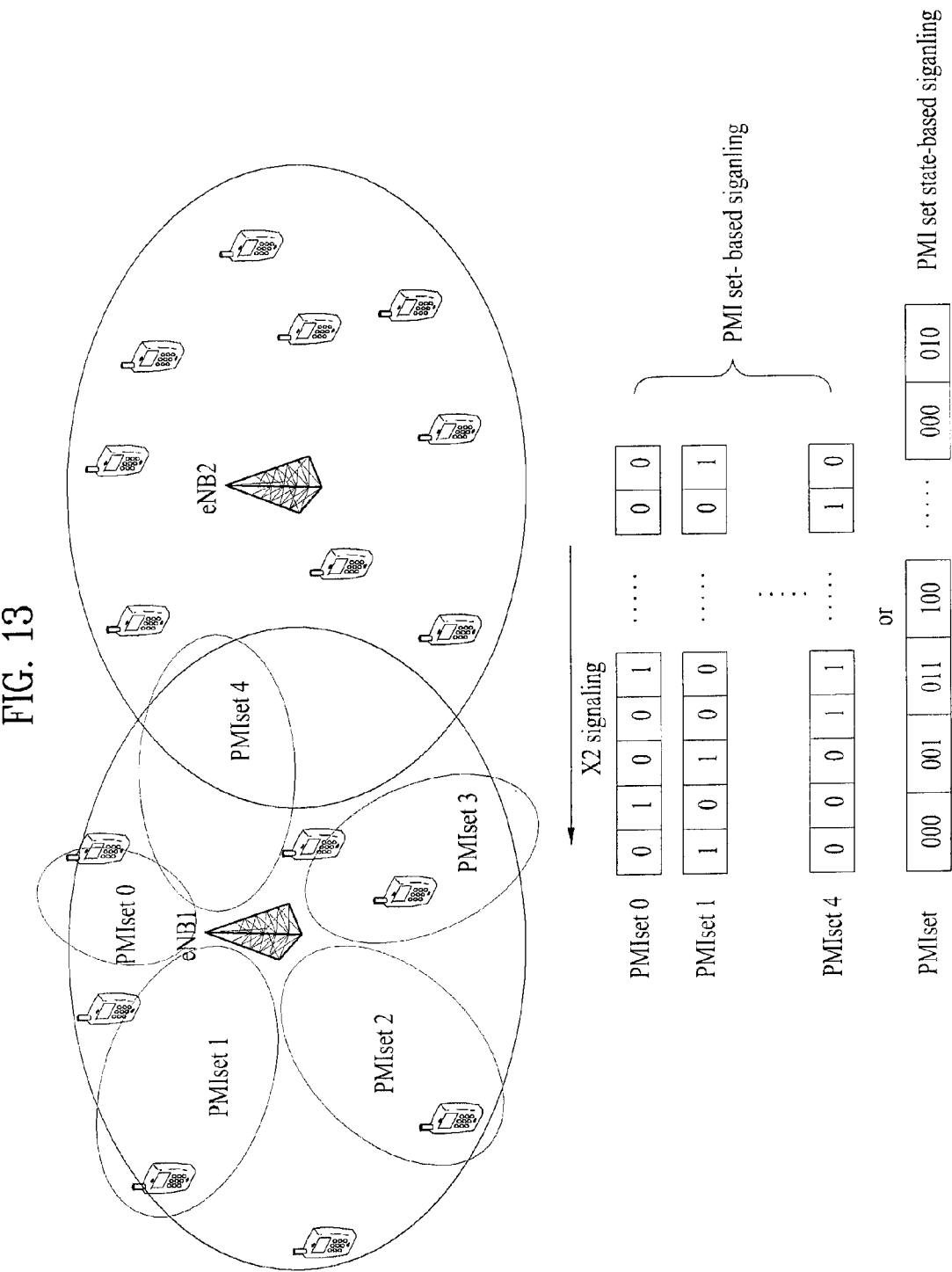
FIG. 13 is a diagram showing another example to which the third embodiment of the present invention is applied.

FIG. 13 is a diagram showing another example to which the third embodiment of the present invention is applied. In FIG. 13, an eNB2 signals a PMIset for requesting application of each subframe to an eNB1. Compared to the example shown in FIG. 12, the example shown in FIG. 13 has an advantage in that scheduling of the cell of the eNB2 is considered first.

Referring to FIG. 13, an eNB2 performs scheduling for each subframe based on CSI reported from UEs within the cell and information about each PMIset of a cell of the eNB1 and signals a PMIset for requesting application in the cell of the eNB1 in each subframe to an eNB1 through an X2 interface. However, for transmission and reception within the eNB1, a specific PMIset may not be requested with respect to a specific subframe.

The eNB1 may perform scheduling for each subframe in consideration of the PMIset signaled from the eNB2 and CSI reported from UEs within the cell. If it is determined that load within the cell is significant, the eNB1 may feed back a subframe set in which a coordinated beamforming scheme is not applied to the eNB2.

Figure 14:
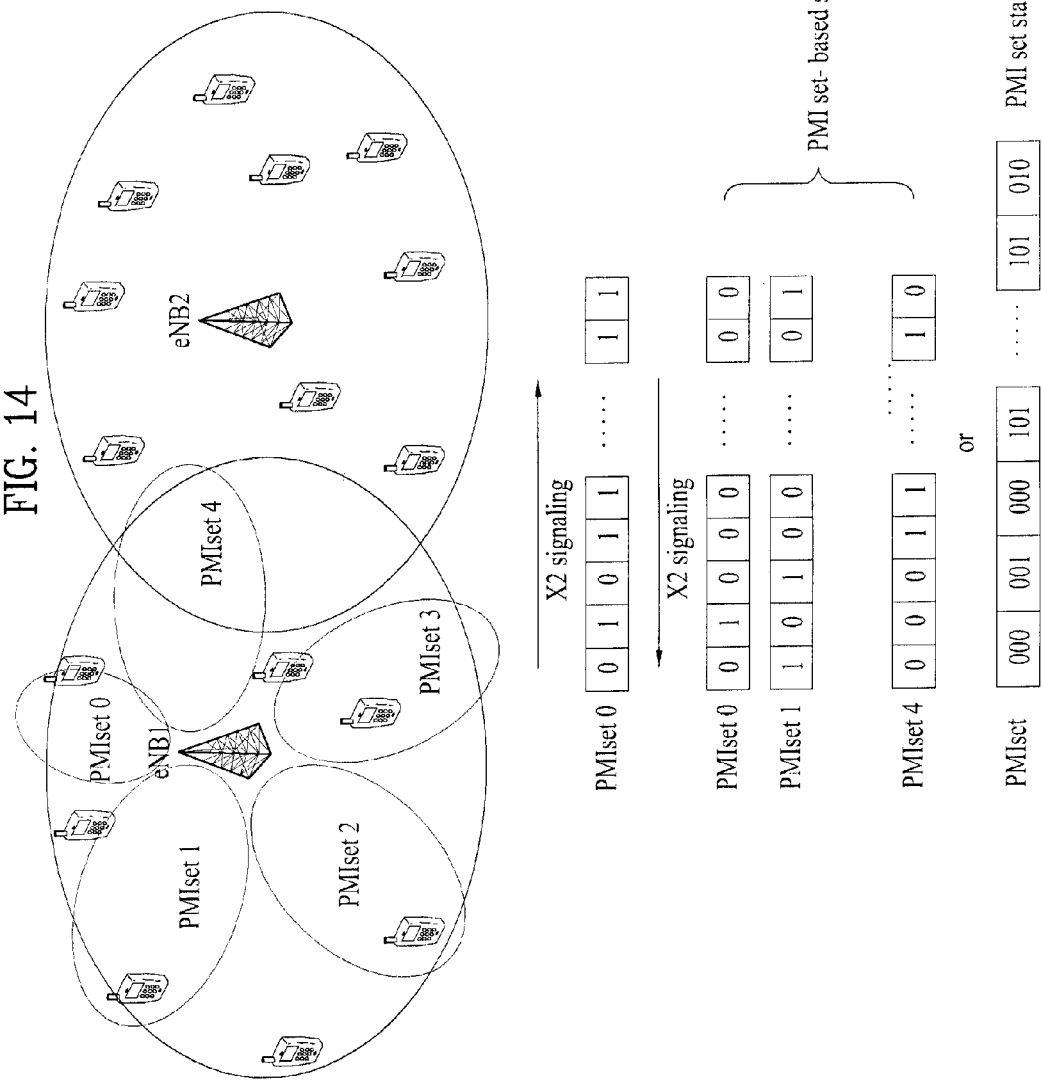
FIG. 14 is a diagram showing still another example to which the third embodiment of the present invention is applied.

FIG. 14 is a diagram showing still another example to which the third embodiment of the present invention is applicable. In FIGS. 12 and 13, the coordinated beamforming scheme is performed based on scheduling of any one eNB cell. However, in FIG. 14, coordinated beamforming is performed by balancing cell load.

Referring to FIG. 14, an eNB1 signals a subframe set which can positively support a PMIset request of an eNB2 in a coordinated beamforming scheme through scheduling within a cell to the eNB2 through an X2 interface. Then, the eNB2 may allocate a PMIset for subframes based on CSI and PMIset information reported from UEs with respect to subframes in which a coordinated beamforming scheme can be performed and feed back the PMIset to the eNB1.

It is desirable that subframes which signal a PMIset preferred by the eNB2 be configured by subframes included in a subframe set signaled by the eNB1 to the eNB2. If the number of subframes desired by the eNB2 is less than the number of subframes signaled by the eNB1, the eNB2 may transmit signaling indicating that application of a coordinated beamforming scheme is abandoned with respect to a specific subframe to the eNB1.

The eNB1 may start coordinated beamforming by scheduling a UE suitable for a PMIset desired by the eNB2 after receiving feedback information from the eNB2. Then although data loss in each subframe can be reduced but a delay which may be generated due to signaling through the X2 interface should be considered.

Alternatively, the eNB1 signals a subframe set in which coordinated beamforming can be performed to the eNB2 and simultaneously applies subframe configuration (e.g. ABS) having a characteristic of reduced transmission power and/or activity in a corresponding subframe. The eNB2 feeds back signaling of the eNB1 and simultaneously performs coordinated beamforming. After receiving feedback information from the eNB2, the eNB1 may start coordinated beamforming by scheduling a UE within the cell using a PMIset desired by the eNB2. In this case, delay which may be generated due to signaling through the X2 interface can be minimized but throughput of a cell of the eNB1 can be reduced.

Figure 15:
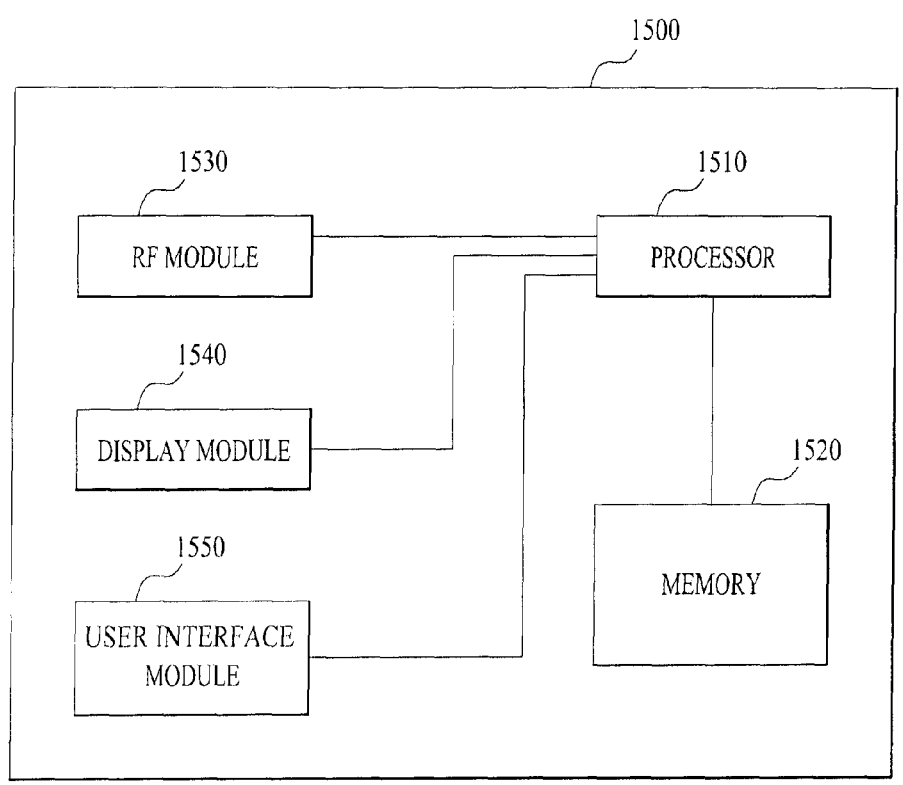
FIG. 15 is a block diagram showing the configuration of a communication device according to an exemplary embodiment of the present invention.

FIG. 15 is a block diagram showing the configuration of a communication device according to an exemplary embodiment of the present invention.

Referring to FIG. 15, a communication device 1500 includes a processor 1510, a memory 1520, an RF module 1530, a display module 1540, and a user interface module 1550.

The communication device 1500 is depicted for convenience of description and some modules may be omitted. The communication device 1500 may further include necessary modules. Some modules of the communication device 1500 may be further divided into segmented modules. The processor 1510 is configured to operate according to the exemplary embodiments of the present invention described with reference to the drawings. For a detailed operation of the processor 1510, reference may be made to a description in conjunction with FIGS. 1 to 14.

The memory 1520 is connected to the processor 1510 and stores operating systems, applications, program code, data, and the like. The RF module 1530 is connected to the processor 1510, and converts a baseband signal into a radio signal or a radio signal into a baseband signal. To this end, the RF module 1530 performs analog conversion, amplification, filtering, and frequency up-conversion or performs the inverse of these processes. The display module 1540 is connected to the processor 1510 and displays a variety of information. The display module 1540 uses, but is not limited to, a well-known element such as a Liquid Crystal Display (LCD), a Light Emitting Diode (LED), an Organic Light Emitting Diode (OLED), or the like. The user interface module 1450 is connected to the processor 1510 and may be configured by a combination of well-known user interfaces such as a keypad, a touchscreen, etc.

The above-described exemplary embodiments are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is apparent that the embodiments may be constructed by a combination of claims which do not have an explicit cited relation in the appended claims or may include new claims by amendment after application.

In the present document, a description of embodiments of the present invention has been made of a data transmission and reception relationship between a UE and an eNB. Here, a specific operation described as being performed by the eNB may be performed by an upper node of the eNB. Namely, it is apparent that, in a network comprised of a plurality of network nodes including the eNB, various operations performed for communication with the UE may be performed by the eNB, or network nodes other than the eNB. The term eNB may be replaced with the terms 'fixed station', 'Node B', 'base station', 'access point', etc.

The exemplary embodiments of the present invention may be achieved by various means, for example, hardware, firmware, software, or a combination thereof. In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the above-described method and apparatus for reducing intercell interference in a wireless communication system has been described as being applied to the 3GPP LTE system, they may be applied to various wireless communication systems in addition to the 3GPP LTE system.

The invention claimed is:

1. A method for transmitting a downlink signal through coordinated beamforming with a neighboring cell at a serving cell in a wireless communication system, comprising:
   transmitting first subframe information for designating one or more subframes to the neighboring cell;
   transmitting first Precoding Matrix Index (PMI) restriction related information including one or more PMIs to a User Equipment (UE) of the serving cell, wherein the PMIs form a beam so that interference affecting the neighboring cell in the one or more subframes has a constant characteristic;
   receiving first Channel State Information (CSI) reporting measured in the one or more subframes based on the first PMI restriction related information from the UE of the serving cell; and
   transmitting a downlink signal to the UE of the serving cell based on the first CSI reporting,
   wherein the neighboring cell receives CSI reporting corresponding to the neighboring cell, measured by the UE of the neighboring cell in the one or more subframes.

2. The method according to claim 1, wherein the neighboring cell transmits a downlink signal to the UE of the neighboring cell based on the CSI reporting corresponding to the neighboring cell in one or more subframes.

3. The method according to claim 1, further comprising:
   transmitting second subframe information indicating one or more subframes to the neighboring cell;
   transmitting second PMI restriction related information including one or more PMIs having a reduced affect on the neighboring cell to the UE of the serving cell; and
   receiving second CSI reporting measure in the one or more subframes based on the second PMI restriction related information from the UE of the serving cell.

4. The method according to claim 3, wherein, in the one or more subframes included in the first subframe information, the first CSI reporting of the serving cell is restricted based on the PMIs included in the first PMI restriction related information, and in the one or more subframes included in the second subframe information, the second CSI reporting of the serving cell is restricted based on the PMIs included in the second PMI restriction related information.

5. The method according to claim 3, wherein each of the first subframe information and the second subframe information includes bitmap information for designating the one or more subframes and PMI restriction information corresponding to each of the one or more subframes.

6. The method according to claim 1, further comprising receiving feedback information corresponding to the first subframe information from the neighboring cell, wherein the feedback information includes at least one of information as to whether the neighboring cell uses the one or more subframes designated by the first subframe information and information as to the number of subframes which should be increased or decreased.

7. The method according to claim 3, wherein if the same PMI is included in the first PMI restriction information and the second PMI restriction information, the first CSI reporting and the second CSI reporting are restricted based on the same PMI in a subframe designated commonly by the first subframe information and the second subframe information.

8. The method according to claim 1, wherein the first subframe information is transmitted to the neighboring cell through an X2 interface.

9. The method according to claim 1, wherein the first PMI restriction related information is transmitted to the UE of the serving cell through upper layer signaling.

10. The method according to claim 1, wherein CSI reporting corresponding to the neighboring cell is measured by the UE of the neighboring cell under the assumption that interference affecting the neighboring cell by the serving cell in the one or more subframes has a constant characteristic.

* * * * *